US012801415B2

(12) United States Patent
Yefremenko et al.

(10) Patent No.: US 12,801,415 B2
(45) Date of Patent: Nov. 17, 2026

(54) CLUSTER CONFIGURATION AUTOMATION

(71) Applicant: Bank of America Corporation, Charlotte, NC (US)

(72) Inventors: Oleksandr Yefremenko, Metuchen, NJ (US); Richard Langevin, Lincoln, RI (US); Affreen Jha, Raleigh, NC (US)

(73) Assignee: Bank of America Corporation, Charlotte, NC (US)

( * ) Notice: Subject to any disclaimer, the term of this patent is extended or adjusted under 35 U.S.C. 154(b) by 677 days.

(21) Appl. No.: 18/142,786

(22) Filed: May 3, 2023

(65) Prior Publication Data

US 2024/0370283 A1 Nov. 7, 2024

(51) Int. Cl.
*G06F 9/455* (2018.01)

(52) U.S. Cl.
CPC ...... *G06F 9/45558* (2013.01); *G06F 9/45541* (2013.01); *G06F 2009/4557* (2013.01)

(58) Field of Classification Search
CPC ............. G06F 9/45558; G06F 9/45541; G06F 2009/4557
See application file for complete search history.

(56) References Cited

U.S. PATENT DOCUMENTS

| | | | |
|---|---|---|---|
| 7,412,702 | B1 | 8/2008 | Nelson et al. |
| 7,849,327 | B2 | 12/2010 | Leung et al. |
| 8,145,836 | B2 | 3/2012 | Nelson et al. |
| 8,296,759 | B1 | 10/2012 | Hutchins et al. |
| 8,316,374 | B2 | 11/2012 | Lim et al. |
| 8,832,692 | B2 | 9/2014 | Fultheim et al. |
| 9,147,373 | B2 | 9/2015 | Cunningham et al. |
| 9,201,875 | B2 | 12/2015 | Kandasamy et al. |
| 9,336,132 | B1 | 5/2016 | Aron et al. |
| 9,448,846 | B2 | 9/2016 | Bass et al. |
| 9,497,264 | B2 | 11/2016 | Miloushev et al. |
| 9,519,795 | B2 | 12/2016 | Guarrieri et al. |
| 9,563,513 | B2 | 2/2017 | Huang et al. |
| 9,639,385 | B2 | 5/2017 | Conover |
| 9,760,291 | B2 | 9/2017 | Beale et al. |

(Continued)

FOREIGN PATENT DOCUMENTS

EP 2191369 B1 6/2018

OTHER PUBLICATIONS

Amazone web services; AWS Elastic Beanstalk Developer Guide API Version Dec. 1, 2010; 2010 (Year: 2010).*

(Continued)

*Primary Examiner* — Dong U Kim
(74) *Attorney, Agent, or Firm* — Banner & Witcoff, Ltd.

(57) ABSTRACT

Automated cluster configuration systems and methods are disclosed. Cluster build requests trigger an automation controller to retrieve automation source code and a baseline cluster configuration. Cluster build instructions are provided by the automation controller to a jump host in a secure zone based on the automation code, the build request, and the baseline configuration. Based on the cluster build instructions, the jump host creates a staging cluster in a server management platform in the secure zone. The server management platform deploys, on a bare metal hypervisor in a DMZ zone outside a firewall, a configured cluster based on instructions from the jump host. Cluster configuration prechecks and post-checks can be performed.

13 Claims, 10 Drawing Sheets

(56) References Cited

U.S. PATENT DOCUMENTS

| | | | |
|---|---|---|---|
| 9,760,408 | B2 | 9/2017 | Beale |
| 9,933,956 | B2 | 4/2018 | Ramachandran et al. |
| 10,241,709 | B2 | 3/2019 | Scales et al. |
| 10,437,865 | B1 | 10/2019 | Clements et al. |
| 10,642,800 | B2 | 5/2020 | Gummaraju et al. |
| 11,144,306 | B2 | 10/2021 | Olderdissen et al. |
| 11,579,914 | B2 | 2/2023 | Bhandari et al. |
| 2019/0095230 | A1* | 3/2019 | Glessner ............. G06F 9/45558 |
| 2019/0361680 | A1* | 11/2019 | Sanchez .................... G06F 8/30 |
| 2021/0055948 | A1 | 2/2021 | Tsirkin et al. |
| 2022/0222100 | A1* | 7/2022 | Srivastava ............ G06F 9/5077 |

OTHER PUBLICATIONS

Shiv Raj Singh, Virtualization and Information Security a Virtualized DMZ Design Consideration Using VMware ESXi 4.1, at Unitec Institute of Technology, New Zealand, 2012 (Year: 2012).*

* cited by examiner

CLUSTER CONFIGURATION AUTOMATION

TECHNICAL FIELD

The present disclosure relates to computer clusters and, more particularly, to systems, methods, and apparatus for an automation controller configuration of computer clusters.

DESCRIPTION OF THE RELATED ART

A group of interconnected computers that behave as if they were a single entity due to their close collaboration is referred to as a computer cluster. Companies use computer clusters in order to provide additional virtual-machine (VM) hosting capacity. In contrast to grid computers, computer clusters are composed of individual nodes that are all programmed to carry out the same function and are managed and coordinated by management software.

A cluster's individual components are typically linked to one another by means of high-speed local area networks. Each node, or computer that acts as a server, is responsible for running its own individual instance of an operating system. Clusters are frequently implemented to improve performance and availability over that of a single computer, and they are typically far more economically efficient than single computers of equal speed or availability. This is because clusters consist of multiple computers working together.

The availability of less expensive microprocessors, high-speed networks, and software designed for high-performance distributed computing led to the development of computer clusters, which came about as a result of the confluence of various trends in the computing industry. They have a wide range of applicability and deployment, ranging from small business clusters consisting of a handful of nodes all the way up to some of the fastest supercomputers in the world. Before clusters were used, single-unit fault-tolerant mainframes with modular redundancy were in use. However, the decreased up-front cost of clusters combined with the enhanced speed of network fabric has favored the use of clusters. Clusters, in contrast to high-reliability mainframes, are less expensive to scale out, but they also have a higher level of complexity in error handling. This is due to the fact that error modes in clusters are not opaque to programs that are now being executed.

Traditionally, computer clusters have been implemented using multiple distinct physical computers all running the same operating system. With the help of virtualization, the nodes of a cluster can operate on separate physical computers that are covered with a virtual layer to make them appear the same as one another and their respective operating systems. While maintenance is being performed, the cluster may also be virtualized on a number of different configurations.

One of the challenges that comes with using a computer cluster is the overhead of administering it, which can sometimes be just as high as the overhead of administering N separate machines if the cluster has N nodes. This is one of the challenges that comes with using a computer cluster and therefore makes virtual machines attractive due to their ease of administration.

A hypervisor is a sort of virtualization software that can also be referred to as a virtual machine monitor. It is used to facilitate the construction and maintenance of virtual machines by decoupling the software and hardware components of a computer. For virtualization to take place, it is necessary to have hypervisors that can translate requests between the physical and virtual resources. It is referred to as a bare metal hypervisor when a hypervisor is put directly on the hardware of a physical machine, in the space that exists between the hardware and the operating system. Some bare metal hypervisors are built into the firmware at the same level as the BIOS on the motherboard. In order for the operating system of a computer to gain access to and make use of virtualization software, certain systems require this in order to function properly.

Because the bare metal hypervisor isolates the operating system from the underlying hardware, the software is no longer dependent on or restricted to particular drivers or devices for the hardware. This indicates that bare metal hypervisors make it possible for operating systems and the applications that go along with them to function on a wide variety of different types of hardware. They also make it possible for a single physical server to host several operating systems as well as virtual computers. As a result of the virtual machines' independence from the underlying physical machine, they are able to migrate from one machine to another or from one platform to another, thereby shifting workloads and distributing networking, memory, storage, and processing resources across a number of servers as needed. When an application, for instance, has a requirement for increased processing power, the virtualization software enables it to easily access additional machines to fulfill that requirement. Further, hypervisors can be clustered across multiple physical servers, so that if one fails, active virtual servers are transferred to another.

PowerShell is a cross-platform (Windows, Linux, and macOS) automation and configuration tool/framework that is optimized for dealing with structured data (e.g. JSON, CSV, XML, etc.), REST APIs (representational state transfer), and object models. It includes a command-line shell, an associated scripting language and a framework for processing cmdlets. Due to the complexities in deploying, configuring, and maintaining clusters, PowerShell scripts are used commonly to configure computer clusters such as utilized with bare metal hypervisors.

PowerShell scripts can contain hardcoded configurations written into the code itself. This is hard to maintain or enhance, lacks the ability to track configuration changes, does not provide a means to perform pre-validations or post-validations, does not support idempotency, and does not support continuously run unit tests. Oftentimes, such scripts are not well documented. PowerShell scripts can take upwards of 10 hours to run on a single cluster of hosting capacity. This problem is compounded as the number of clusters is scaled up.

Hence, there is a need for an automated cluster provisioning, configuration, and orchestration system.

SUMMARY OF THE INVENTION

In accordance with one or more arrangements of the non-limiting sample disclosures contained herein, solutions are provided to address one or more of the shortcomings by, inter alia: automated cluster configuration systems and methods in which (a) cluster build requests trigger an automation controller to retrieve automation source code and a baseline cluster configuration; (b) cluster build instructions are provided by the automation controller to a jump host in a secure zone based on the automation code, the build request, and the baseline configuration; (c) based on the cluster build instructions, the jump host creates a staging cluster in a server management platform in the secure zone; and/or (d) the server management platform deploys, on a bare metal hypervisor in a DMZ zone outside a firewall, a configured cluster based on instructions from the jump host. Various modifications and additions can be made with respect to the foregoing including, for example, having the automation controller provide a playbook to the jump host and having the jump host retrieve the source code and baseline configuration from one or more repositories.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an automated cluster configuration method can comprise one or more steps such as, inter alia: detecting, by an automation controller in a secure zone, a build request for a proposed cluster; validating, by the automation controller, the build request; retrieving, by the automation controller from a source code repository in the secure zone, automation code corresponding to the build request; retrieving, by the automation controller from a configuration repository in the secure zone, a baseline configuration corresponding to the build request; and/or executing, by the automation controller, cluster configuration pre-checks to determine whether the proposed cluster is viable. If the proposed cluster is viable, one or more additional steps can be performed including, inter alia, transmitting, by the automation controller to a jump host in the secure zone, cluster build instructions based on the automation code, the build request, and the baseline configuration; creating, by the jump host based on the cluster build instructions, a staging cluster in a server management platform in the secure zone; deploying, by the server management platform on a bare metal hypervisor in a DMZ zone outside a firewall, a configured cluster; and/or executing, by the server management platform, cluster configuration post-checks to confirm correct operation of the configured cluster. If the proposed cluster is not viable, alarms or error messages may be generated and remedial actions can be taking include making corrections based on artificial intelligence and/or machine learning or otherwise allowing for manual modifications to address any pre or post implementation issues.

In some arrangements, an automated cluster configuration method can comprise one or more steps of, inter alia: detecting, by an automation controller in a secure zone, a build request for a proposed cluster; validating, by the automation controller, the build request; retrieving, by the automation controller from a source code repository in the secure zone, automation code corresponding to the build request; retrieving, by the automation controller from a configuration repository in the secure zone, a baseline configuration corresponding to the build request; executing, by the automation controller, cluster configuration pre-checks to determine whether the proposed cluster is viable. The cluster configuration pre-checks can include, inter alia, one or more of: verifying, by the server management platform, that a datacenter for the proposed cluster exists; verifying, by the server management platform, that a name for the proposed cluster is not already in use at the datacenter; verifying, by the server management platform, that the hosts are in a staging cluster; verifying, by the server management platform, that the hosts have a required number of capacity and cache disks according to the baseline configuration; verifying, by the server management platform, that the hosts have an identical number of physical network interface controllers (PNICs); verifying, by the server management platform, that disabled protocols in the hosts match the baseline configuration; and/or verifying, by the server management platform, an IPV6 configuration for the proposed cluster. If the proposed cluster is viable, one or more additional steps can be performed including, inter alia: transmitting, by the automation controller to a jump host in the secure zone, cluster build instructions based on the automation code, the build request, and the baseline configuration; creating, by the jump host based on the cluster build instructions, the staging cluster in a server management platform in the secure zone; deploying, by the server management platform on a bare metal hypervisor in a DMZ zone outside a firewall, a configured cluster; and/or executing, by the server management platform, cluster configuration post-checks to confirm correct operation of the configured cluster. The cluster configuration post-checks can include one or more of, inter alia: verifying, by the server management platform, that the hosts are attached to the configured cluster; verifying, by the server management platform, that a network folder exists; verifying, by the server management platform, a DVS configuration for the distributed virtual switch; verifying, by the server management platform, a LACP configuration for the distributed virtual switch; verifying, by the server management platform, the distributed resource configuration for the configured cluster; verifying, by the server management platform, the cluster services; and/or verifying, by the server management platform, an absence of unacknowledged alarms.

In some arrangements, an automated cluster configuration method can comprise the steps of, inter alia: detecting, by an automation controller in a secure zone, a build request for a proposed cluster; validating, by the automation controller, the build request; retrieving, by the automation controller from a source code repository in the secure zone, automation code corresponding to the build request; retrieving, by the automation controller from a configuration repository in the secure zone, a baseline configuration corresponding to the build request; and/or executing, by the automation controller, cluster configuration pre-checks to determine whether the proposed cluster is viable. The cluster configuration pre-checks can include, inter alia: verifying, by the server management platform, that a datacenter for the proposed cluster exists; verifying, by the server management platform, that a name for the proposed cluster is not already in use at the datacenter; verifying, by the server management platform, that the hosts are in the staging cluster; verifying, by the server management platform, that the hosts have required number of capacity and cache disks according to the baseline configuration; verifying, by the server management platform, that the hosts have an identical number of physical network interface controllers; verifying, by the server management platform, that disabled protocols in the hosts match the baseline configuration; and/or verifying, by the server management platform, an IPV6 configuration for the proposed cluster. If the proposed cluster is viable, additional configuration steps can be performed including: transmitting, by the automation controller to a jump host in the secure zone, cluster build instructions based on the automation code, the build request, and the baseline configuration; creating, by the jump host based on the cluster build instructions, a staging cluster in a server management platform in the secure zone; deploying, by the server management platform on a bare metal hypervisor in a DMZ zone outside a firewall, a configured cluster; creating, by the server management platform, a distributed virtual switch for the configured cluster; receiving, by the server management platform from a distributed resource scheduler (DRS), a distributed resource configuration; applying, by the server management platform to the configured cluster, the distributed resource configuration; creating, by the server management platform, a resource pool for the configured cluster; enabling, by the server management platform, cluster services for the configured cluster; creating, by the server management platform, a resource pool for the configured cluster; executing, by the server management platform on the distributed virtual switch (DVS) for the configured cluster, a link aggregation control protocol (LCAP); and/or executing, by the server management platform, cluster configuration post-checks to confirm correct operation of the configured cluster. The cluster configuration post-checks can include: verifying, by the server management platform, that the hosts are attached to the configured cluster; verifying, by the server management platform, that a network folder exists; verifying, by the server management platform, a DVS configuration for the distributed virtual switch; verifying, by the server management platform, a LACP configuration for the distributed virtual switch; verifying, by the server management platform, the distributed resource configuration for the configured cluster; verifying, by the server management platform, the cluster services; and/or verifying, by the server management platform, an absence of unacknowledged alarms.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
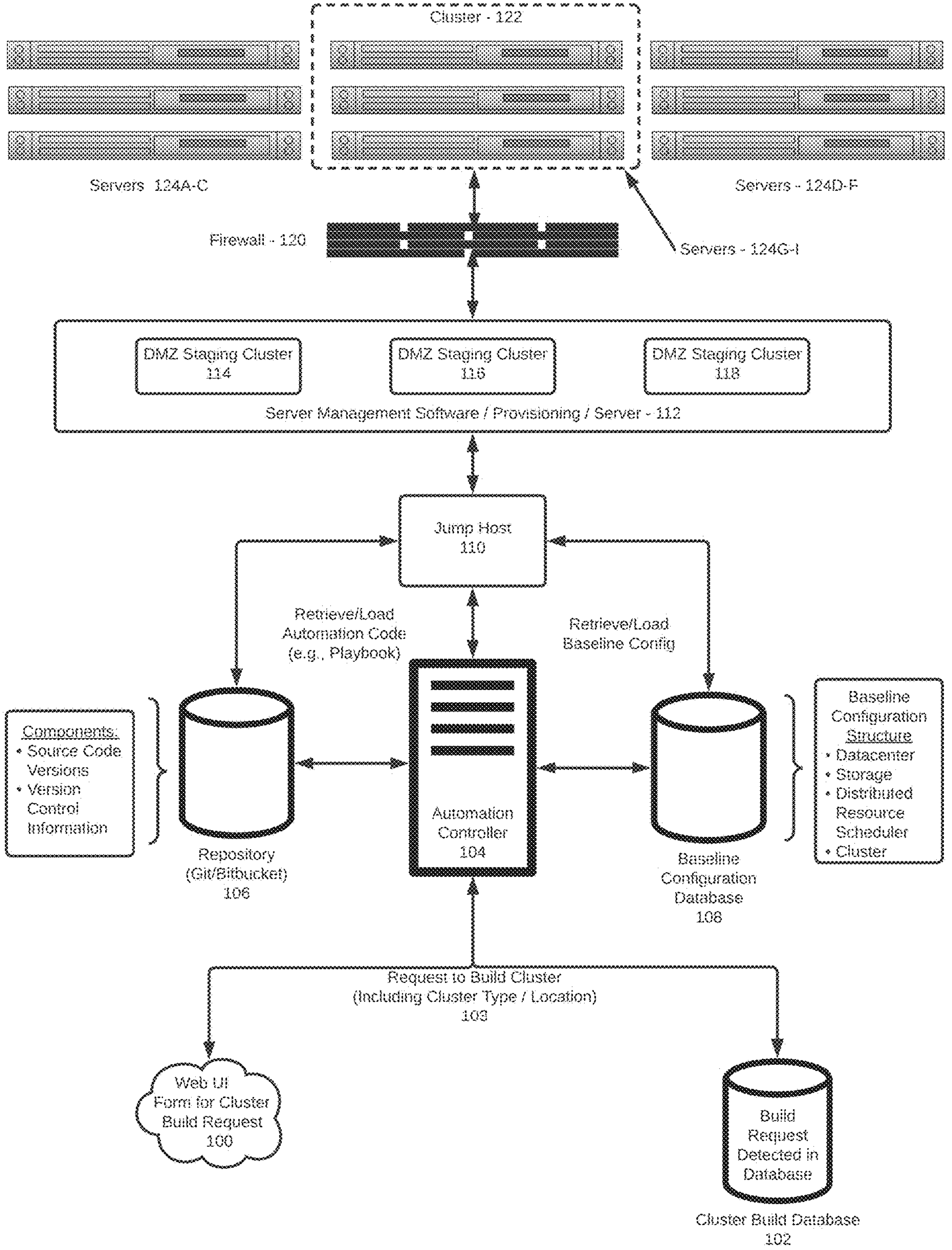
FIG. 1 depicts a sample, abstracted, system architecture including various interactions, interfaces, steps, functions, and components in accordance with one or more cluster configuration aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, automation controllers, clients, cloud devices, clusters (and staging clusters), compliance watchers, computing devices, computing platforms, controlled computers, controlling computers, desktop computers, distributed systems, enterprise computers, jump hosts, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/repositories/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a sample, abstracted, system architecture including various interactions, interfaces, steps, functions, and components in accordance with one or more cluster configuration aspects of this disclosure.

A cluster build request 100 can be received from a Web UI form or other input mechanism or method. Alternatively, build requests in a cluster build database 102 or the like may be automatically detected by an automation controller 104. A request 103 to build a cluster, including the cluster type, location, and other cluster related variable information, is received, or detected by the automation controller 104.

An automation controller 104 can provide an automation playbook to a jump host 110 to deploy, provision, and configure a cluster. Source code for implementing the playbook can be stored in a repository (e.g., Git/BitBucket) 106 and can include the source code versions and version control information. This automation code can be retrieved/loaded by the jump host 110 or by the automation controller 104 and then provided to the jump host. Alternatively, the source code materials can be retrieved from or loaded directly by jump host 110.

Automation controller 104 can also provide, as part of the automation playbook or separately, baseline configuration information retrieved or loaded from a baseline configuration database 108, and then provide the same to jump host 110. The baseline configuration information may include a datacenter identification, storage information, a distributed resource scheduler, cluster information, etc. Alternatively, the baseline configuration materials can be retrieved from or loaded directly by jump host 110.

Server management software and provisioning as well as a hardware server (if desired or computing can be performed elsewhere) 112 can receive cluster instructions from the jump host 110. These instructions can then be used to set up one or more DMZ staging clusters 114, 116, and/or 118 for deployment beyond firewall 120 in a DMZ zone.

A computing cluster 122 can therefore contain any number of desired hardware servers or components such as 124A-G based on instructions provided by the management software/server 112.

Figure 2:
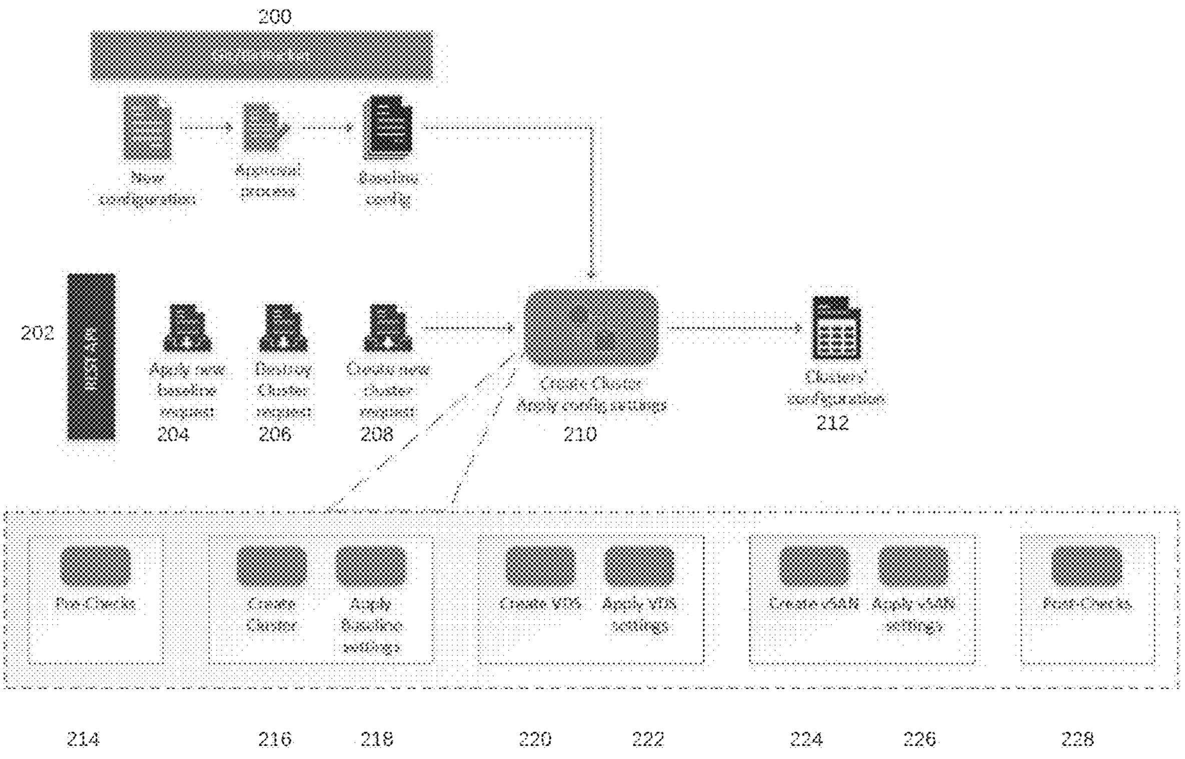
FIG. 2 depicts a sample, abstracted, automated, design pattern for cluster configuration architecture including various interactions, interfaces, steps, functions, and components in accordance with various aspects of this disclosure.

By way of non-limiting disclosure, FIG. 2 depicts a sample, abstracted, automated, design pattern for cluster configuration architecture including various interactions, interfaces, steps, functions, and components in accordance with various aspects of this disclosure.

A Git/BitBucket 200 or the like may store source code information and/or baseline configurations. A new configuration can be provided. The proposed configuration can be authorized. A baseline configuration can then be stored. A REST API can apply a new baseline request 204, destroy a cluster request 206, and create a new cluster request 208. Upon receiving a create request, an automation controller can create a cluster and apply the configuration settings in 210. The clusters configuration 212 can be stored.

As part of the cluster configuration process 210, prechecks may be performed 214. The cluster can be created 216 and baseline settings can be applied 218. A virtual distributed switch (VDS) can be created 220 and VDS settings can be applied 222. A vSAN or the like can be created 224 and vSAN settings can be applied 226. For reference. For reference, a VMware vSAN or other similar enterprise storage virtualization software can aggregate local and direct-attached data storage devices across a cluster or the like to create a single data store that all hosts in a cluster can share. Post-checks can then be performed in 228 to verify correct operation and configuration of the cluster.

Figure 3:
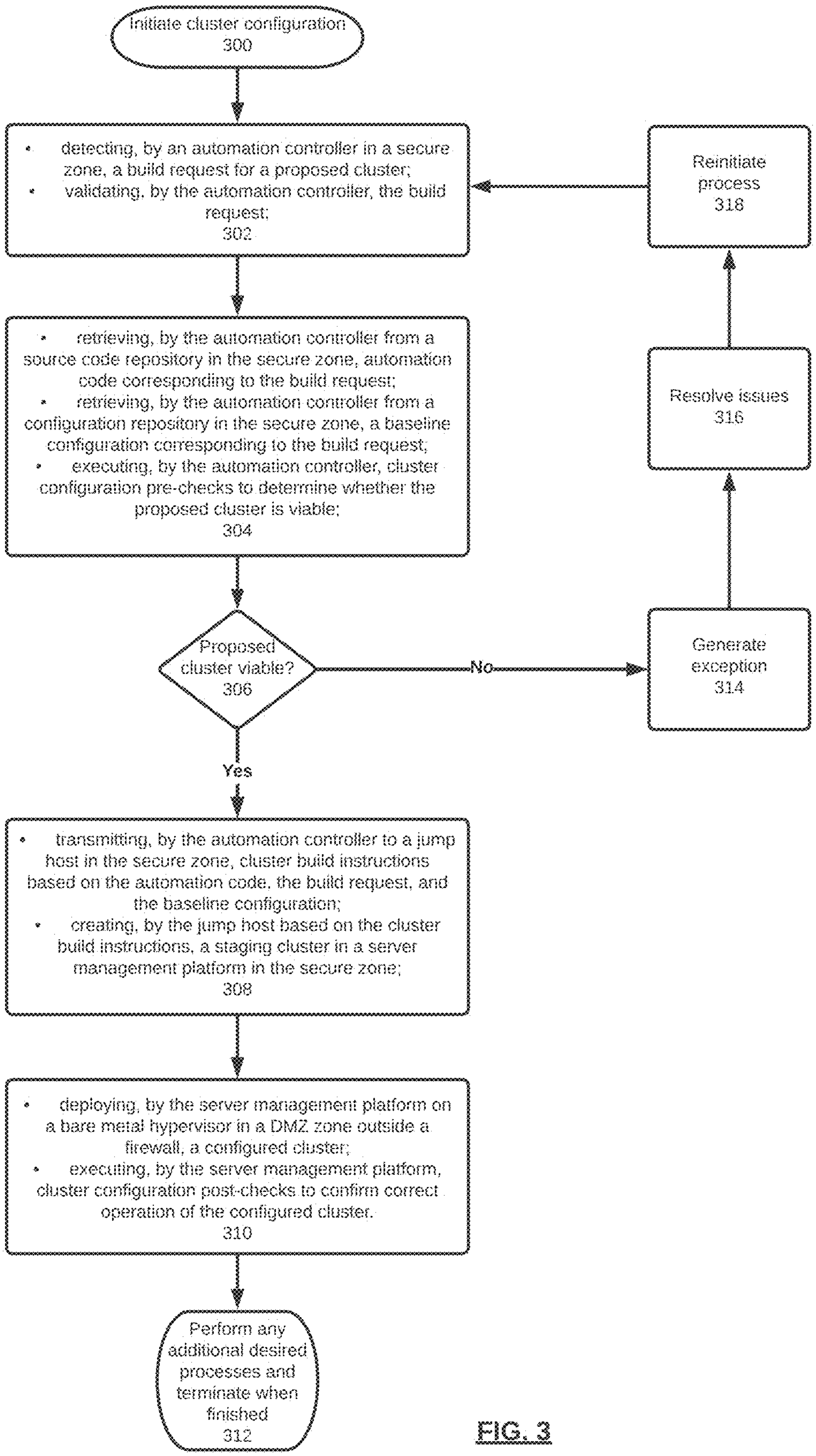
FIG. 3 depicts an example functional flow diagram showing sample interactions, interfaces, steps, and functions for implementing with one or more aspects of this disclosure as they relate to cluster configuration.

By way of non-limiting disclosure, FIG. 3 depicts an example functional flow diagram showing sample interactions, interfaces, steps, and functions for implementing with one or more aspects of this disclosure as they relate to cluster configuration.

An automated cluster configuration method can be initiated in 300. In 302, sample functions of: detecting, by an automation controller in a secure zone, a build request for a proposed cluster; and/or validating, by the automation controller, the build request, can be performed.

In 304, sample functions of: retrieving, by the automation controller from a source code repository in the secure zone, automation code corresponding to the build request; retrieving, by the automation controller from a configuration repository in the secure zone, a baseline configuration corresponding to the build request; and/or executing, by the automation controller, cluster configuration pre-checks to determine whether the proposed cluster is viable, can be executed.

A determination is made as to whether the proposed cluster is viable in 306. If so, sample functions of: transmitting, by the automation controller to a jump host in the secure zone, cluster build instructions based on the automation code, the build request, and/or the baseline configuration; creating, by the jump host based on the cluster build instructions, a staging cluster in a server management platform in the secure zone; deploying, by the server management platform on a bare metal hypervisor in a DMZ zone outside a firewall, a configured cluster; and/or executing, by the server management platform, cluster configuration post-checks to confirm correct operation of the configured cluster, can be performed.

If the proposed cluster is not viable, alarms or error messages may be generated 314. These may be stored for future reference and/or automatically transmitted to applicable processes or individuals. Any issues can then be resolved manually or automatically such as, for example, based on artificial intelligence or machine learning in 316. The process may then be reinitiated in 318.

Figure 4:
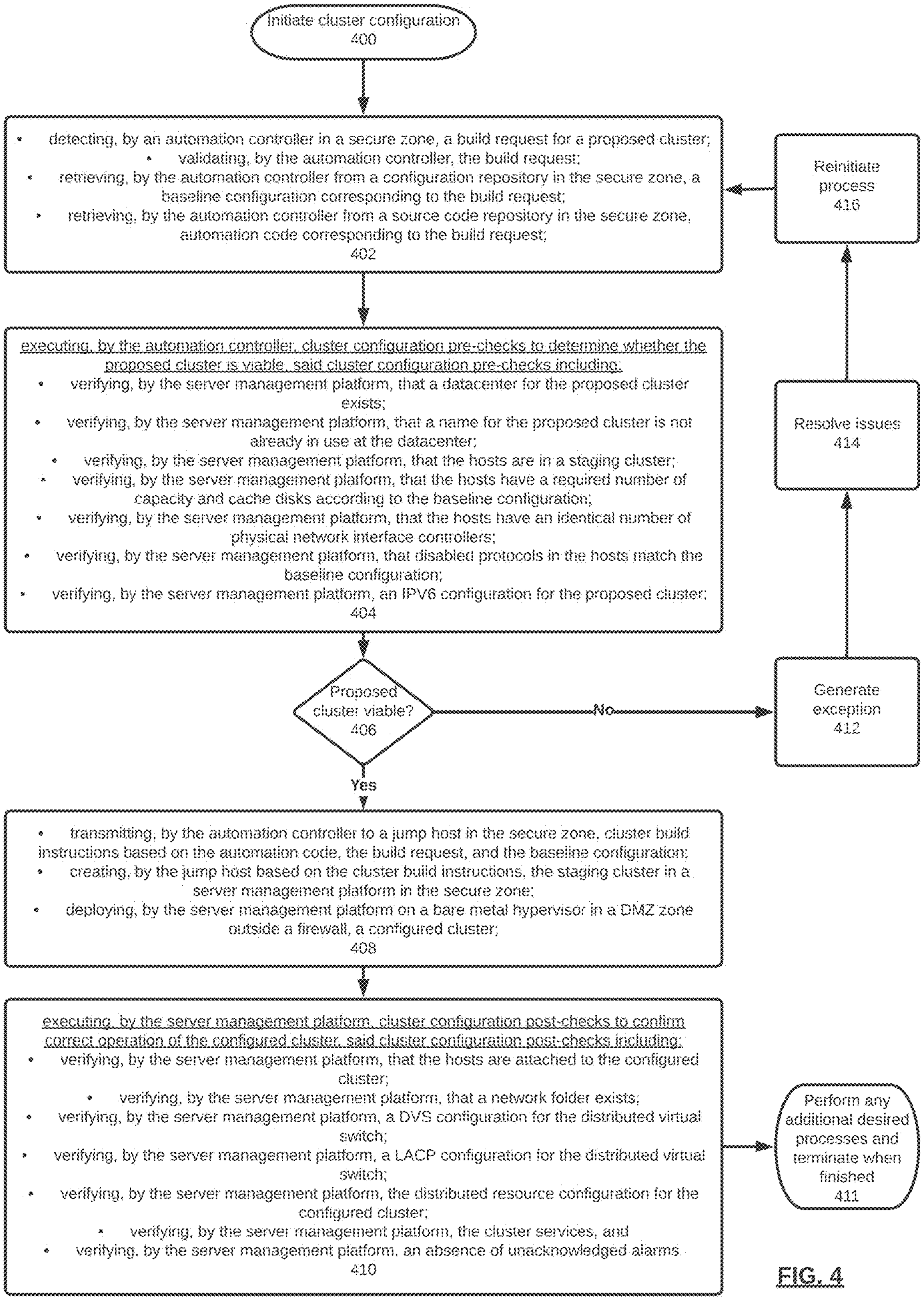
FIG. 4 depicts another functional flow diagram showing sample interactions, interfaces, steps, and functions for implementing with one or more aspects of this disclosure as they relate to cluster configuration.

By way of non-limiting disclosure, FIG. 4 depicts another functional flow diagram showing sample interactions, interfaces, steps, and functions for implementing with one or more aspects of this disclosure as they relate to cluster configuration. The automated cluster configuration method is initiated in 400.

In 402, sample steps of: detecting, by an automation controller in a secure zone, a build request for a proposed cluster; and/or validating, by the automation controller, the build request, can be performed. Again, this type of request can be provided to the automation controller directly from another process or user such as, for example, by using a Web UI form, or can be detected automatically by the automation controller based on periodic scans or when an interrupt notification or other message is received by the automation controller. Additional functions can be performed including: retrieving, by the automation controller from a source code repository in the secure zone, automation code corresponding to the build request; and/or retrieving, by the automation controller from a configuration repository in the secure zone, a baseline configuration corresponding to the build request.

In 404, the function of executing, by the automation controller, cluster configuration pre-checks to determine whether the proposed cluster is viable, is implemented. The cluster configuration pre-checks can include one or more of, inter alia: verifying, by the server management platform, that a datacenter for the proposed cluster exists; verifying, by the server management platform, that a name for the proposed cluster is not already in use at the datacenter; verifying, by the server management platform, that the hosts are in a staging cluster; verifying, by the server management platform, that the hosts have a required number of capacity and cache disks according to the baseline configuration; verifying, by the server management platform, that the hosts have an identical number of physical network interface controllers; verifying, by the server management platform, that disabled protocols in the hosts match the baseline configuration; and/or verifying, by the server management platform, an IPV6 configuration for the proposed cluster.

Based on the proposed cluster viability determination 406, one or more additional steps can be performed if viable including, inter alia, as in 408: transmitting, by the automation controller to a jump host in the secure zone, cluster build instructions based on the automation code, the build request, and/or the baseline configuration; creating, by the jump host based on the cluster build instructions, the staging cluster in a server management platform in the secure zone; and/or deploying, by the server management platform on a bare metal hypervisor in a DMZ zone outside a firewall, a configured cluster.

In 410, the function of executing, by the server management platform, cluster configuration post-checks to confirm correct operation of the configured cluster can be implemented. The cluster configuration post-checks can include one or more of, inter alia: verifying, by the server management platform, that the hosts are attached to the configured cluster; verifying, by the server management platform, that a network folder exists; verifying, by the server management platform, a DVS configuration for the distributed virtual switch; verifying, by the server management platform, a LACP configuration for the distributed virtual switch; verifying, by the server management platform, the distributed resource configuration for the configured cluster; verifying, by the server management platform, the cluster services; and/or verifying, by the server management platform, an absence of unacknowledged alarms. Additional desired processing may be performed, and the configuration method may terminate or repeat as desired once the current configuration is finished 411.

If the proposed cluster is not viable in 406, alarms or error messages may be generated 412. These may be stored for future reference and/or automatically transmitted to applicable processes or individuals. Any issues can then be resolved in 414 manually or automatically such as, for example, based on artificial intelligence or machine learning. The process may then be reinitiated in 416.

Figure 5:
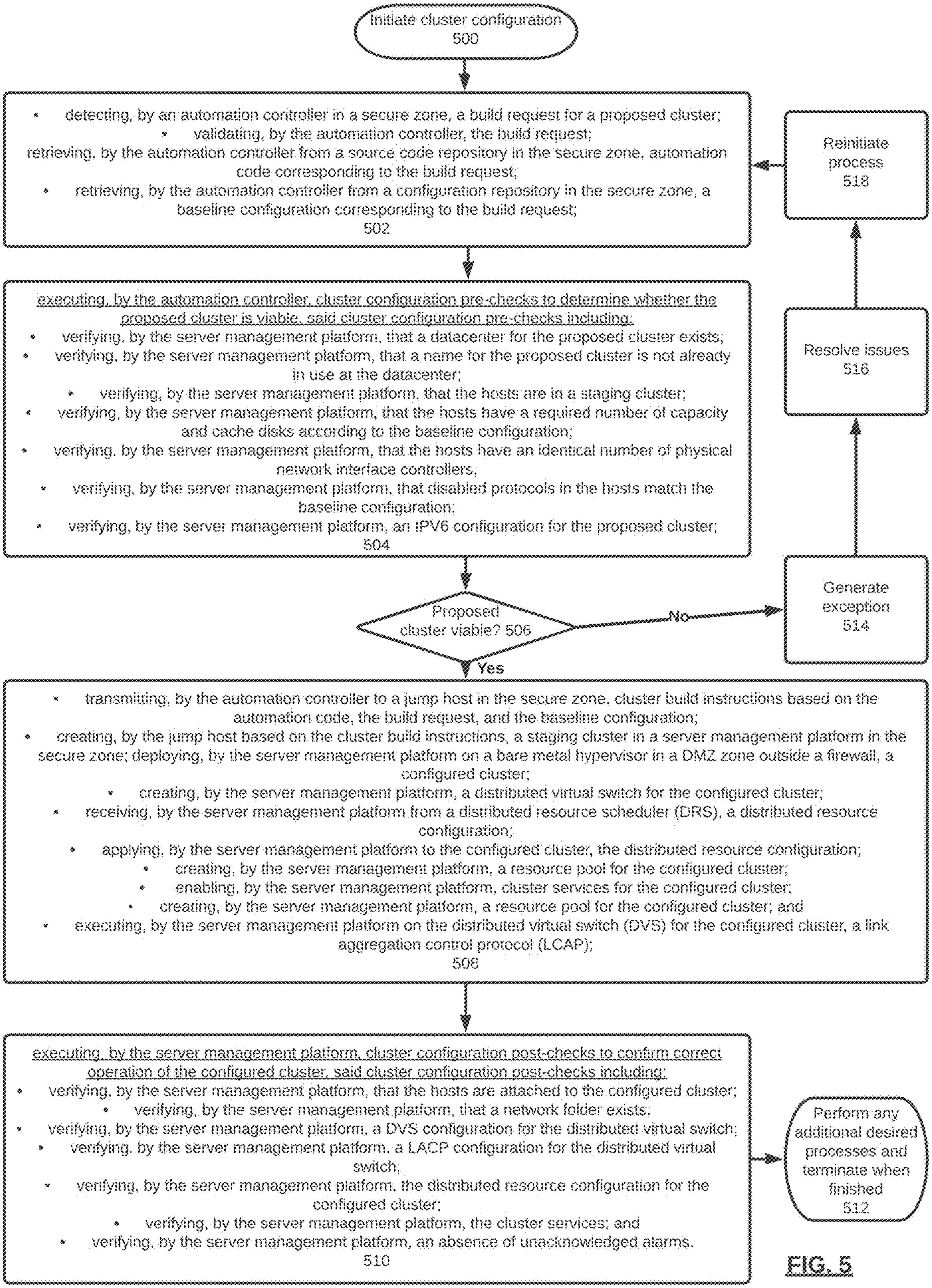
FIG. 5 depicts a further functional flow diagram showing sample interactions, interfaces, steps, and functions for implementing with one or more aspects of this disclosure as they relate to cluster configuration.

By way of non-limiting disclosure, FIG. 5 depicts a further functional flow diagram showing sample interactions, interfaces, steps, and functions for implementing with one or more aspects of this disclosure as they relate to cluster configuration. This automated cluster configuration method is initiated in 500.

In 502, sample steps of: detecting, by an automation controller in a secure zone, a build request for a proposed cluster; validating, by the automation controller, the build request; retrieving, by the automation controller from a source code repository in the secure zone, automation code corresponding to the build request; and/or retrieving, by the automation controller from a configuration repository in the secure zone, a baseline configuration corresponding to the build request, are performed.

In 504, the function of executing, by the automation controller, cluster configuration pre-checks to determine whether the proposed cluster is viable, is implemented. The cluster configuration pre-checks can include: verifying, by the server management platform, that a datacenter for the proposed cluster exists; verifying, by the server management platform, that a name for the proposed cluster is not already in use at the datacenter; verifying, by the server management platform, that the hosts are in the staging cluster; verifying, by the server management platform, that the hosts have required number of capacity and cache disks according to the baseline configuration; verifying, by the server management platform, that the hosts have an identical number of physical network interface controllers; verifying, by the server management platform, that disabled protocols in the hosts match the baseline configuration; and/or verifying, by the server management platform, an IPV6 configuration for the proposed cluster.

If the proposed cluster is viable based on the determination in 506, additional configuration steps can be performed as in 508 including: transmitting, by the automation controller to a jump host in the secure zone, cluster build instructions based on the automation code, the build request, and the baseline configuration; creating, by the jump host based on the cluster build instructions, a staging cluster in a server management platform in the secure zone; deploying, by the server management platform on a bare metal hypervisor in a DMZ zone outside a firewall, a configured cluster; creating, by the server management platform, a distributed virtual switch for the configured cluster; receiving, by the server management platform from a distributed resource scheduler (DRS), a distributed resource configuration; applying, by the server management platform to the configured cluster, the distributed resource configuration; creating, by the server management platform, a resource pool for the configured cluster; enabling, by the server management platform, cluster services for the configured cluster; creating, by the server management platform, a resource pool for the configured cluster; and/or executing, by the server management platform on the distributed virtual switch (DVS) for the configured cluster, a link aggregation control protocol (LCAP).

In 510, the function of executing, by the server management platform, cluster configuration post-checks can be performed to confirm correct operation of the configured cluster. The cluster configuration post-checks can include: verifying, by the server management platform, that the hosts are attached to the configured cluster; verifying, by the server management platform, that a network folder exists; verifying, by the server management platform, a DVS configuration for the distributed virtual switch; verifying, by the server management platform, a LACP configuration for the distributed virtual switch; verifying, by the server management platform, the distributed resource configuration for the configured cluster; verifying, by the server management platform, the cluster services; and/or verifying, by the server management platform, an absence of unacknowledged alarms. Additional desired processing may be performed, and the configuration method may terminate or repeat as desired once the current configuration is finished 523.

If the proposed cluster is not viable in 506, alarms or error messages may be generated 514. These may be stored for future reference and/or automatically transmitted to applicable processes or individuals. Any issues can then be resolved in 516 manually or automatically such as, for example, based on artificial intelligence or machine learning. The process may then be reinitiated in 518.

Figure 6A:
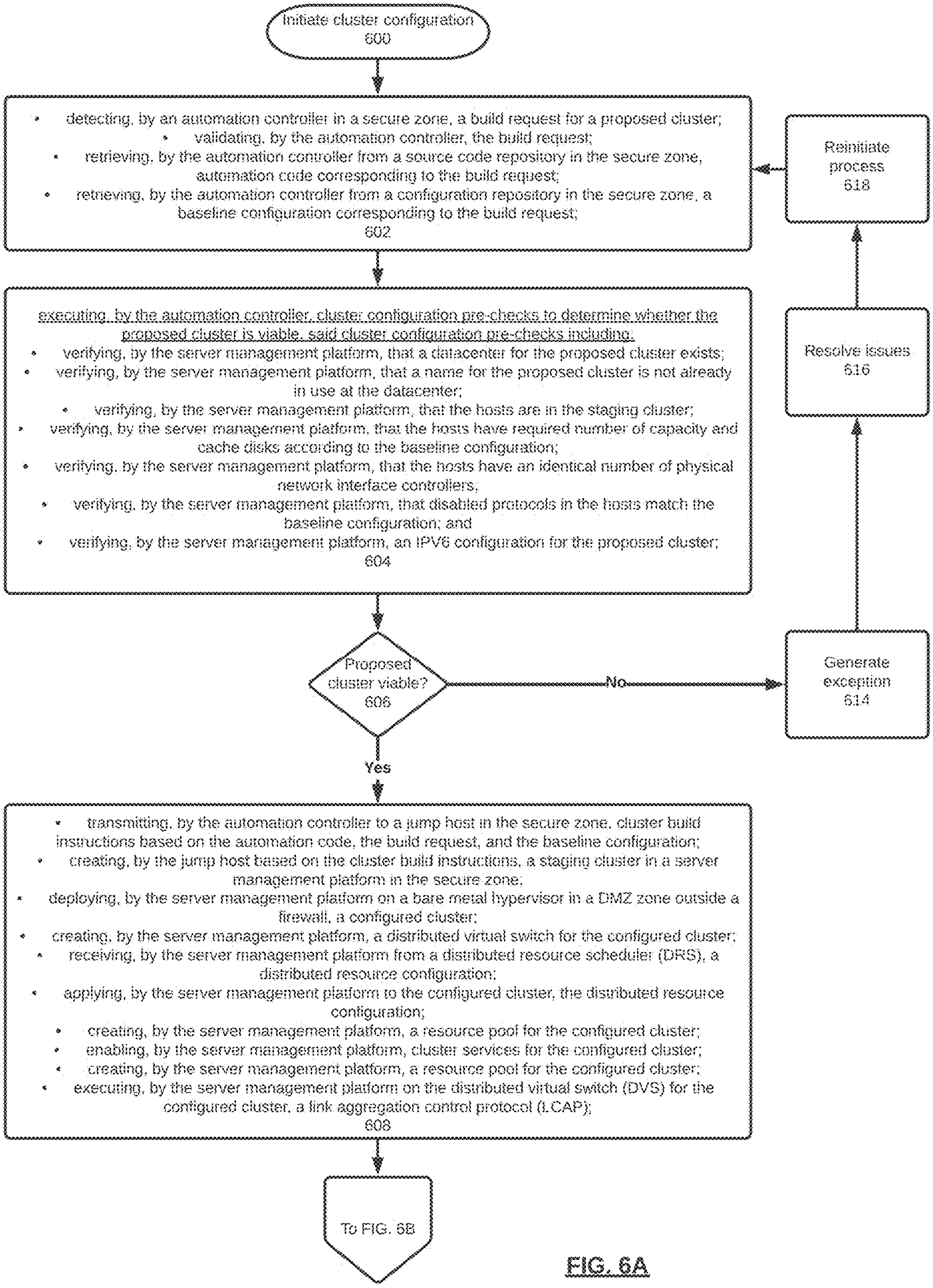
FIGS. 6A-6B depict an additional functional flow diagram showing sample interactions, interfaces, steps, and functions for implementing with one or more aspects of this disclosure as they relate to cluster configuration.
Figure 6B:
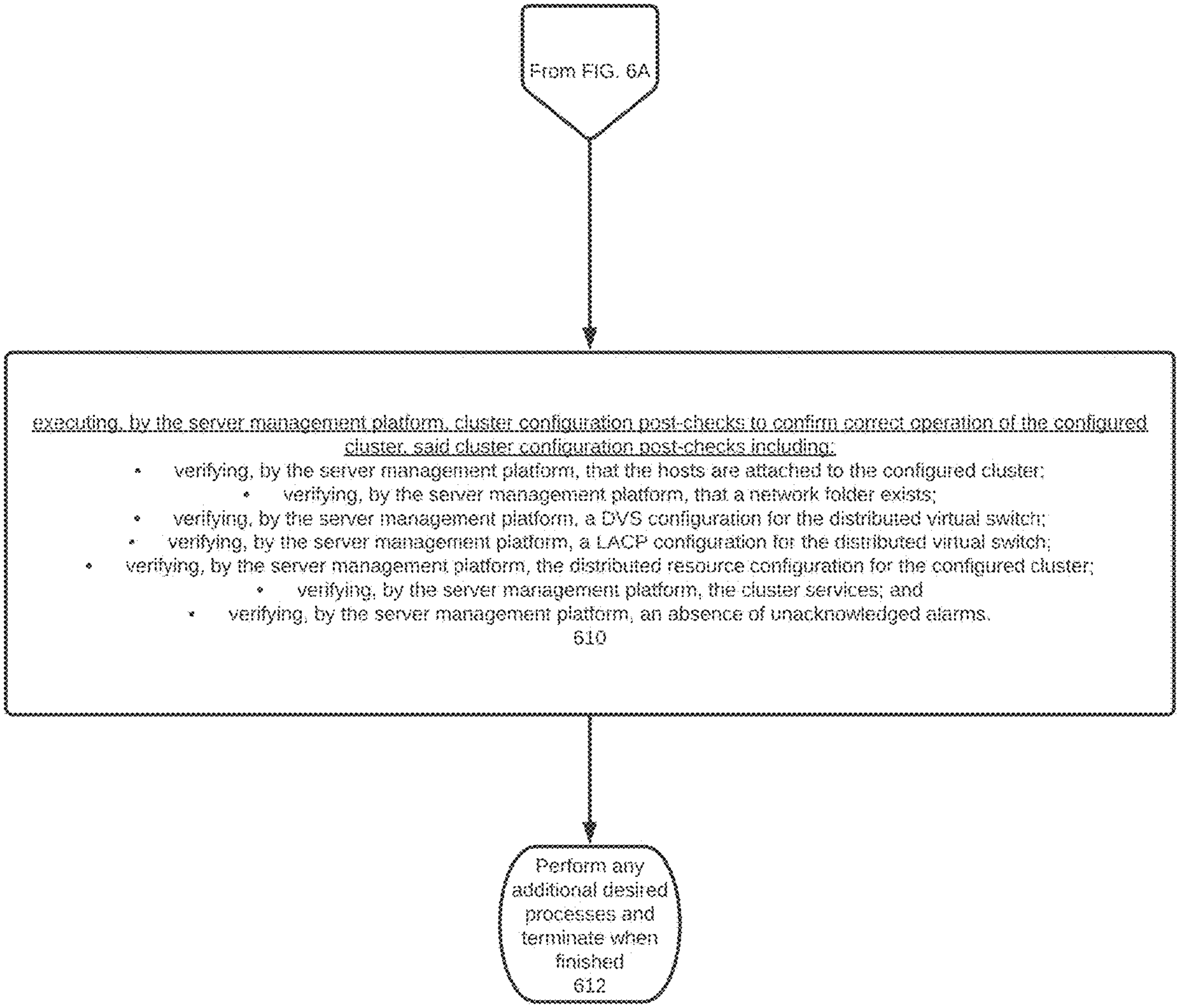

By way of non-limiting disclosure, FIGS. 6A-6B depict an additional functional flow diagram showing sample interactions, interfaces, steps, and functions for implementing with one or more aspects of this disclosure as they relate to cluster configuration. The process may commence in 600.

In 602, sample steps such as: detecting, by an automation controller in a secure zone, a build request for a proposed cluster; validating, by the automation controller, the build request; retrieving, by the automation controller from a source code repository in the secure zone, automation code corresponding to the build request; and/or retrieving, by the automation controller from a configuration repository in the secure zone, a baseline configuration corresponding to the build request, can be performed.

In 604, the function of executing, by the automation controller, cluster configuration pre-checks to determine whether the proposed cluster is viable, can be implemented. The cluster configuration pre-checks can include: verifying, by the server management platform, that a datacenter for the proposed cluster exists; verifying, by the server management platform, that a name for the proposed cluster is not already in use at the datacenter; verifying, by the server management platform, that the hosts are in the staging cluster; verifying, by the server management platform, that the hosts have required number of capacity and cache disks according to the baseline configuration; verifying, by the server management platform, that the hosts have an identical number of physical network interface controllers; verifying, by the server management platform, that disabled protocols in the hosts match the baseline configuration; and/or verifying, by the server management platform, an IPV6 configuration for the proposed cluster.

If the proposed cluster is viable in 606, functions are performed in 608 including: transmitting, by the automation controller to a jump host in the secure zone, cluster build instructions based on the automation code, the build request, and the baseline configuration; creating, by the jump host based on the cluster build instructions, a staging cluster in a server management platform in the secure zone; deploying, by the server management platform on a bare metal hypervisor in a DMZ zone outside a firewall, a configured cluster; creating, by the server management platform, a distributed virtual switch for the configured cluster; receiving, by the server management platform from a distributed resource scheduler (DRS), a distributed resource configuration; applying, by the server management platform to the configured cluster, the distributed resource configuration; creating, by the server management platform, a resource pool for the configured cluster; enabling, by the server management platform, cluster services for the configured cluster; creating, by the server management platform, a resource pool for the configured cluster; and/or executing, by the server management platform on the distributed virtual switch (DVS) for the configured cluster, a link aggregation control protocol (LCAP).

As shown in FIG. 6B, various post-checks may be executed in 610, by the server management platform, cluster configuration post-checks to confirm correct operation of the configured cluster. The cluster configuration post-checks can include: verifying, by the server management platform, that the hosts are attached to the configured cluster; verifying, by the server management platform, that a network folder exists; verifying, by the server management platform, a DVS configuration for the distributed virtual switch; verifying, by the server management platform, a LACP configuration for the distributed virtual switch; verifying, by the server management platform, the distributed resource configuration for the configured cluster; verifying, by the server management platform, the cluster services; and/or verifying, by the server management platform, an absence of unacknowledged alarms. Like before, additional desired processing may be performed, and the configuration method may terminate or repeat as desired once the current configuration is finished 612.

If the proposed cluster is not viable in 606 (FIG. 6A), alarms or error messages may be generated 614. These may be stored for future reference and/or automatically transmitted to applicable processes or individuals. Any issues can then be resolved in 616 manually or automatically such as, for example, based on artificial intelligence or machine learning. The process may then be reinitiated in 618.

Figure 7A:
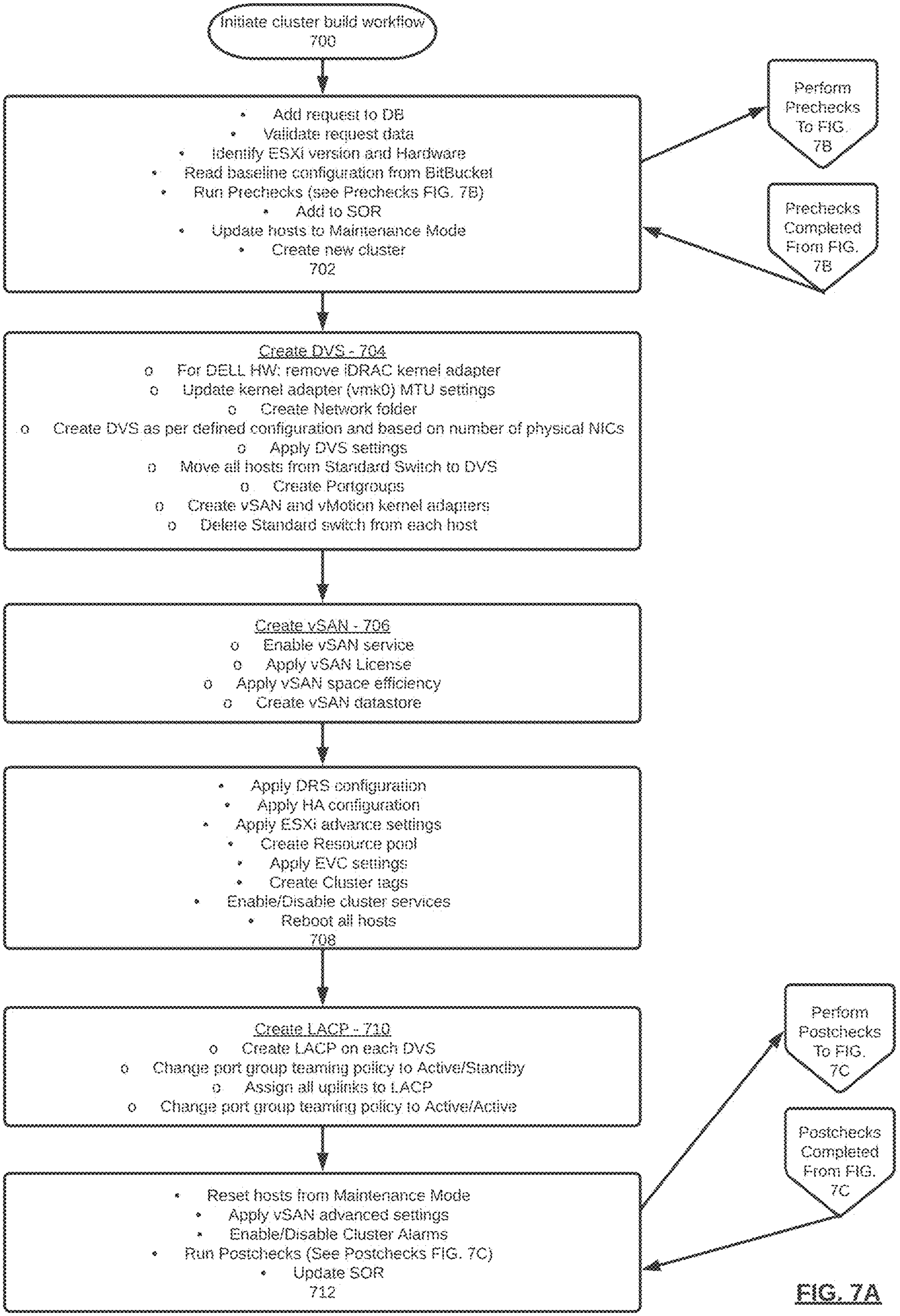
FIG. 7A depicts another functional flow diagram showing sample interactions, interfaces, steps, and functions for implementing with one or more aspects of this disclosure as they relate to cluster configuration.

FIG. 7A depicts an additional functional flow diagram showing sample interactions, interfaces, steps, and functions for implementing with one or more aspects of this disclosure as they relate to cluster configuration. This particular example shows the potential implementation with VMware hardware and software in order to demonstrate the versatility of the various cluster configuration approaches contained herein. Thus, the inventive configuration methodologies and structures can be adapted to be utilized in conjunction with various vendors and their software/hardware products.

After the cluster build workflow or process is initiated in 700, various steps can be performed in 702 such as: add build request to a build database, validate the request data, identify ESXi version and hardware (i.e., a VMware bare metal hypervisor), read baseline configuration from BitBucket, run pre-checks (see pre-checks below and in FIG. 7B), add to a system of records (SOR), update hosts to maintenance mode, and create new cluster.

A distributed virtual switch (DVS) can be created in 704. This can include: remove iDRAC kernel adapter for Dell hardware (Integrated Dell Remote Access Controller), update kernel adapter (vmk0) maximum transmission unit (MTU) settings, create network folder, create DVS as per defined configuration and based on number of physical NICs, apply DVS settings, move all hosts from standard switch(es) to DVS, create portgroups, create vSAN and vMotion kernel adapters, and/or delete standard switch(es) from each host.

In 706, a vSAN can be created. This can include: enable vSAN service, apply vSAN license, apply vSAN space efficiency, and/or create vSAN datastore.

Next, in 708, various functions can be implemented such as: apply distributed resource scheduler (DRS) configuration, apply a high availability (HA) configuration, apply ESXi advance settings, create resource pool, apply EVC settings (i.e., VMware Enhanced vMotion Compatibility), create cluster tags, enable/disable cluster services, and/or reboot all hosts.

In 710, an LACP can be created on each DVS. The port group teaming policy to can be changed to Active/Standby. All uplinks to the LACP can be assigned.

Hosts can be reset from maintenance mode in 712. In addition, vSAN advanced settings can be applied, cluster alarms can be enabled/disabled, post-checks can be run (as in FIG. 7C and described below), and/or a system of records (SOR) or the like can be updated.

Figure 7B:
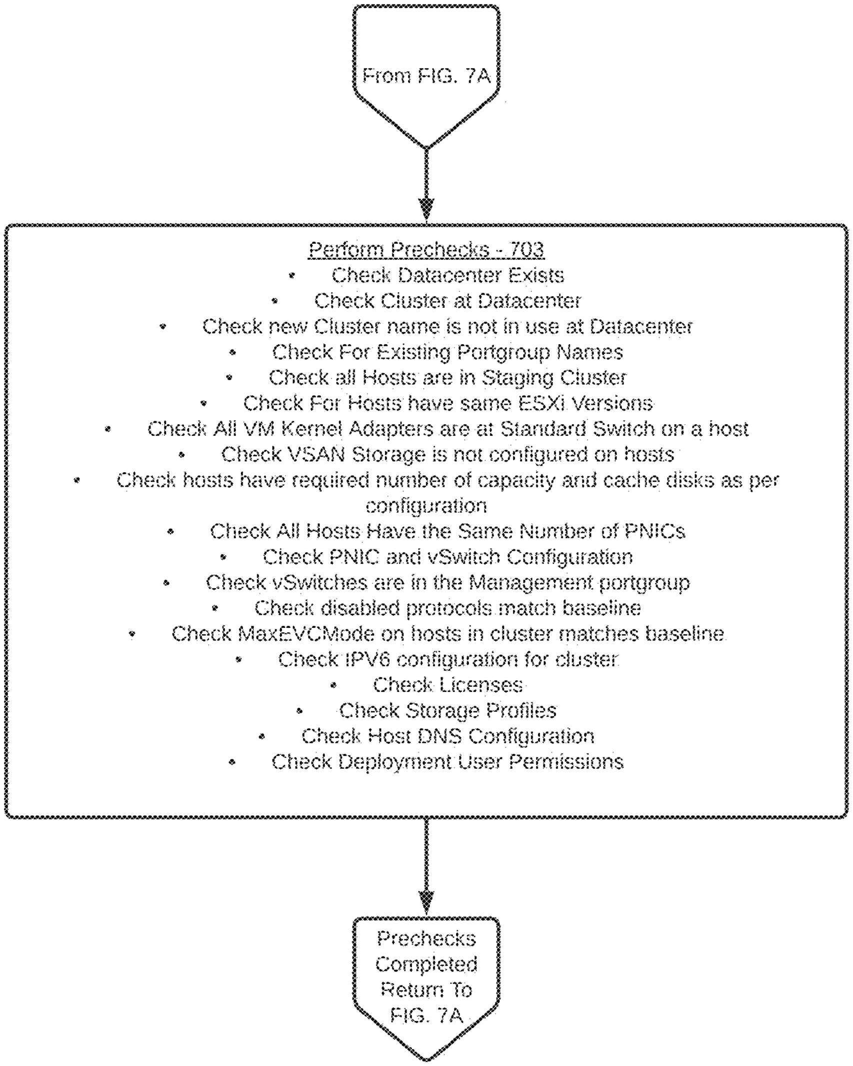
FIG. 7B depicts sample pre-checks that can be implemented in accordance with one or more aspects of this disclosure as they relate to cluster configuration.

FIG. 7B depicts, in 703, sample pre-checks that can be implemented in accordance with one or more aspects of this disclosure as they relate to cluster configuration.

Sample pre-checks can include, inter alia, one or more of: check if datacenter exists, check cluster at datacenter, check that new cluster name is not in use at datacenter, check for existing portgroup names, check that all hosts are in staging cluster, check that hosts have the same ESXi versions, check all VM kernel adapters are at standard switch on a host, check vSAN storage is not configured on hosts, check that hosts have required number of capacity and cache disks as per configuration, check all hosts have the same number of PNICs, check PNIC and vSwitch configuration, check vSwitches are in the management portgroup, check disabled protocols match baseline, check MaxEVCMode on hosts in cluster matches baseline, check IPV6 configuration for cluster, check licenses, check storage profiles, check host DNS configuration, and/or check deployment user permissions.

Figure 7C:
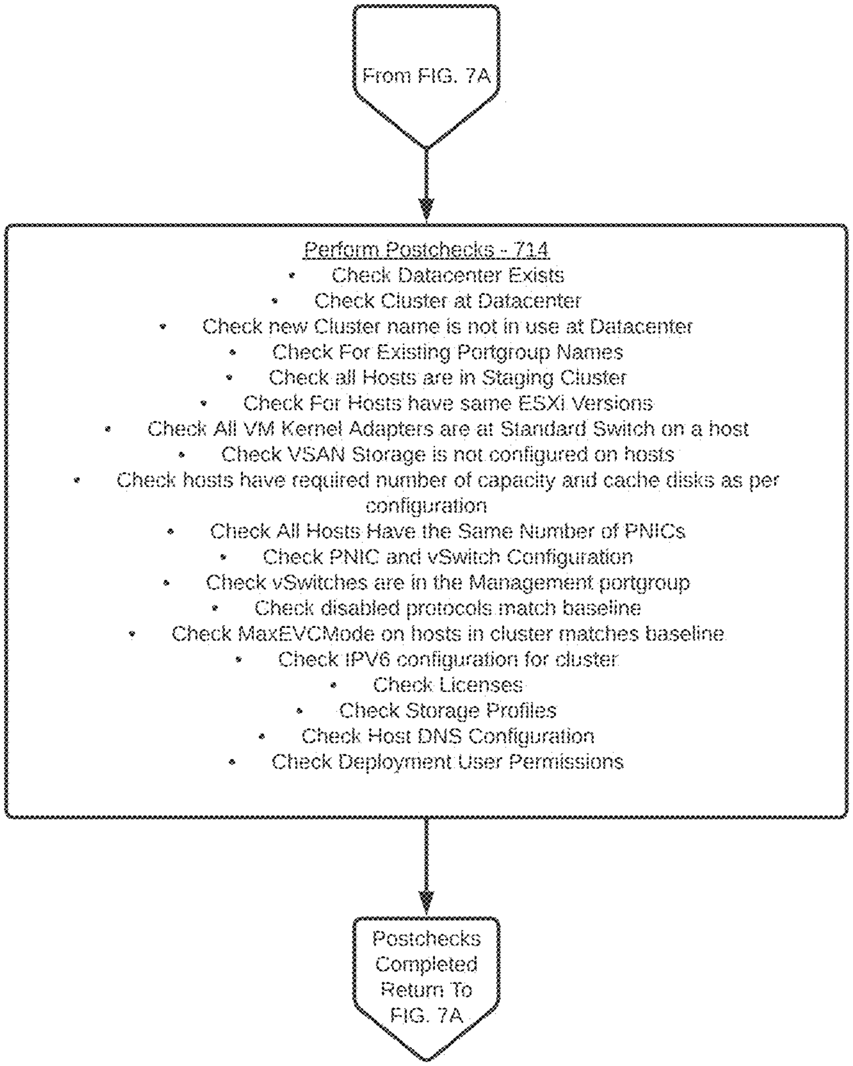
FIG. 7C depicts sample post-checks that can be implemented in accordance with one or more aspects of this disclosure as they relate to cluster configuration.

FIG. 7C depicts, in 714 sample post-checks that can be implemented in accordance with one or more aspects of this disclosure as they relate to cluster configuration.

Sample post-checks can include, inter alia, one or more of: check datacenter exists, check cluster at datacenter, check new cluster name is not in use at datacenter, check for existing portgroup names, check all hosts are in staging cluster, check for hosts have same ESXi versions, check all VM kernel adapters are at standard switch on a host, check vSAN storage is not configured on hosts, check hosts have required number of capacity and cache disks as per configuration, check all hosts have the same number of PNICs, check PNIC and vSwitch configuration, check vSwitches are in the management portgroup, check disabled protocols match baseline, check MaxEVCMode on hosts in cluster matches baseline, check IPV6 configuration for cluster, check licenses, check storage profiles, check host DNS configuration, and/or check deployment user permissions Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An automated cluster configuration method comprising the steps of:

detecting, by an automation controller in a secure zone, a build request for a proposed computer cluster comprising a plurality of hosts each running an instance of an operating system;

validating, by the automation controller, request data of the build request;

retrieving, by the automation controller from a source code repository in the secure zone, automation code corresponding to the build request;

retrieving, by the automation controller from a configuration repository in the secure zone, a baseline configuration corresponding to the build request;

executing, by the automation controller, cluster configuration pre-checks to determine whether the proposed cluster is viable, said cluster configuration pre-checks including:

verifying, by a server management platform, that a datacenter for the proposed cluster exists;

verifying, by the server management platform, that the hosts have a required number of capacity and cache disks according to the baseline configuration; and verifying, by the server management platform, that the hosts have an identical number of physical network interface controllers to each other;

determining the proposed cluster is viable:

transmitting, by the automation controller to a jump host in the secure zone, cluster build instructions based on the automation code, the build request, and the baseline configuration;

creating, by the jump host based on the cluster build instructions, a staging cluster in the server management platform in the secure zone;

deploying, by the server management platform on a bare metal hypervisor in a demilitarized zone (DMZ) outside a firewall, a configured cluster;

creating, by the server management platform, a distributed virtual switch (DVS) for the configured cluster;

aggregating, by the server management platform, local and direct-attached data storage devices across the configured cluster to create a unified data store;

receiving, by the server management platform from a distributed resource scheduler (DRS), a distributed resource configuration;

applying, by the server management platform to the configured cluster, the distributed resource configuration;

creating, by the server management platform, a resource pool for the configured cluster;

enabling, by the server management platform, cluster services for the configured cluster;

switching, by the server management platform, the hosts in the configured cluster into a maintenance mode;

rebooting, by the server management platform, the hosts in the configured cluster;

executing, by the server management platform on the distributed virtual switch (DVS) for the configured cluster, a link aggregation control protocol (LACP);

resetting, by the server management platform, the hosts from the maintenance mode to a normal operational mode;

executing, by the server management platform, cluster configuration post-checks to confirm correct operation of the configured cluster, said cluster configuration post-checks including: verifying, by the server management platform, that the hosts are attached to the configured cluster; and verifying, by the server management platform, an absence of unacknowledged alarms.

2. The automated cluster configuration method of claim 1 wherein the automation controller detects the build request from a database record.

3. The automated cluster configuration method of claim 1 wherein the automation controller detects the build request based on receipt of web-page user-interface form.

4. The automated cluster configuration method of claim 1 further comprising the step of creating, by the server management platform, cluster tags associated with the configured cluster.

5. The automated cluster configuration method of claim 1 further comprising the step of enabling, by the server management platform, alarms for the configured cluster.

6. The automated cluster configuration method of claim 5 further comprising the step of adding, by the server management platform to a system-of-records database, information regarding the configured cluster.

7. The automated cluster configuration method of claim 6 wherein the cluster configuration pre-checks include:

verifying, by the server management platform, that a datacenter for the proposed cluster exists;

verifying, by the server management platform, that a name for the proposed cluster is not already in use at the datacenter;

verifying, by the server management platform, that the hosts are in the staging cluster;

verifying, by the server management platform, that the hosts have a required number of capacity and cache disks according to the baseline configuration;

verifying, by the server management platform, that the hosts have an identical number of physical network interface controllers to each other;

verifying, by the server management platform, that disabled network protocols in the hosts match the baseline configuration;

verifying, by the server management platform, an Internet Protocol version 6 (IPV6) configuration for the proposed cluster;

verifying, by the server management platform, software licenses for the proposed cluster;

verifying, by the server management platform, host domain name system (DNS) configurations for the proposed cluster; and verifying, by the server management platform, user deployment provisions for the build request.

8. The automated cluster configuration method of claim 7 wherein the cluster configuration post-checks include:

verifying, by the server management platform, that the hosts are attached to the configured cluster;

verifying, by the server management platform, that a network folder exists;

verifying, by the server management platform, a distributed virtual switch (DVS) configuration for the distributed virtual switch;

verifying, by the server management platform, a link aggregation control protocol (LACP) configuration for the distributed virtual switch;

verifying, by the server management platform, the distributed resource configuration for the configured cluster;

verifying, by the server management platform, the cluster services; and verifying, by the server management platform, an absence of unacknowledged alarms.

9. The automated cluster configuration method of claim 1, wherein determining the proposed cluster is not viable:

identifying, by the automation controller, an error condition; and generating, by the automation controller, an alarm corresponding to the error condition.

10. An automated cluster configuration method comprising the steps of:

detecting, by an automation controller in a secure zone, a build request for a proposed computer cluster comprising a plurality of hosts each running an instance of an operating system;

validating, by the automation controller, request data of the build request;

retrieving, by the automation controller from a source code repository in the secure zone, automation code corresponding to the build request;

retrieving, by the automation controller from a configuration repository in the secure zone, a baseline configuration corresponding to the build request;

executing, by the automation controller, cluster configuration pre-checks to determine whether the proposed cluster is viable, said cluster configuration pre-checks including:

verifying, by the server management platform, that a datacenter for the proposed cluster exists;

verifying, by the server management platform, that a name for the proposed cluster is not already in use at the datacenter;

verifying, by the server management platform, that the hosts are in a staging cluster;

verifying, by the server management platform, that the hosts have a required number of capacity and cache disks according to the baseline configuration;

verifying, by the server management platform, that the hosts have an identical number of physical network interface controllers to each other;

verifying, by the server management platform, that disabled network protocols in the hosts match the baseline configuration; and verifying, by the server management platform, an Internet Protocol version 6 (IPV6) configuration for the proposed cluster;

determining if the proposed cluster is viable:

transmitting, by the automation controller to a jump host in the secure zone, cluster build instructions based on the automation code, the build request, and the baseline configuration;

creating, by the jump host based on the cluster build instructions, the staging cluster in a server management platform in the secure zone;

deploying, by the server management platform on a bare metal hypervisor in a demilitarized zone (DMZ) outside a firewall, a configured cluster;

executing, by the server management platform, cluster configuration post-checks to confirm correct operation of the configured cluster, said cluster configuration post-checks including:

verifying, by the server management platform, that the hosts are attached to the configured cluster;

verifying, by the server management platform, that a network folder exists;

verifying, by the server management platform, a DVS configuration for the distributed virtual switch;

verifying, by the server management platform, a LACP configuration for the distributed virtual switch;

verifying, by the server management platform, the distributed resource configuration for the configured cluster;

verifying, by the server management platform, the cluster services; and verifying, by the server management platform, an absence of unacknowledged alarms.

11. The automated cluster configuration method of claim 10, wherein determining the proposed cluster is not viable:

identifying, by the automation controller, an error condition; and generating, by the automation controller, an alarm corresponding to the error condition.

12. An automated cluster configuration method comprising the steps of:

detecting, by an automation controller in a secure zone, a build request for a proposed computer cluster comprising a plurality of hosts each running an instance of an operating system;

validating, by the automation controller, request data of the build request;

retrieving, by the automation controller from a source code repository in the secure zone, automation code corresponding to the build request;

retrieving, by the automation controller from a configuration repository in the secure zone, a baseline configuration corresponding to the build request;

executing, by the automation controller, cluster configuration pre-checks to determine whether the proposed cluster is viable, said cluster configuration pre-checks including:

verifying, by the server management platform, that a datacenter for the proposed cluster exists;

verifying, by the server management platform, that a name for the proposed cluster is not already in use at the datacenter;

verifying, by the server management platform, that the hosts are in the staging cluster;

verifying, by the server management platform, that the hosts have a required number of capacity and cache disks according to the baseline configuration;

verifying, by the server management platform, that the hosts have an identical number of physical network interface controllers to each other;

verifying, by the server management platform, that disabled network protocols in the hosts match the baseline configuration; and verifying, by the server management platform, an Internet Protocol version 6 (IPV6) configuration for the proposed cluster;

determining if the proposed cluster is viable:

transmitting, by the automation controller to a jump host in the secure zone, cluster build instructions based on the automation code, the build request, and the baseline configuration;

creating, by the jump host based on the cluster build instructions, a staging cluster in a server management platform in the secure zone;

deploying, by the server management platform on a bare metal hypervisor in a demilitarized zone (DMZ) outside a firewall, a configured cluster;

creating, by the server management platform, a distributed virtual switch (DVS) for the configured cluster;

receiving, by the server management platform from a distributed resource scheduler (DRS), a distributed resource configuration;

applying, by the server management platform to the configured cluster, the distributed resource configuration;

creating, by the server management platform, a resource pool for the configured cluster;

enabling, by the server management platform, cluster services for the configured cluster;

creating, by the server management platform, a resource pool for the configured cluster;

executing, by the server management platform on the distributed virtual switch for the configured cluster, a link aggregation control protocol (LACP);

executing, by the server management platform, cluster configuration post-checks to confirm correct operation of the configured cluster, said cluster configuration post-checks including:

verifying, by the server management platform, that the hosts are attached to the configured cluster;

verifying, by the server management platform, that a network folder exists;

verifying, by the server management platform, a DVS configuration for the distributed virtual switch;

verifying, by the server management platform, a LACP configuration for the distributed virtual switch;

verifying, by the server management platform, the distributed resource configuration for the configured cluster;

verifying, by the server management platform, the cluster services; and verifying, by the server management platform, an absence of unacknowledged alarms.

13. The automated cluster configuration method of claim 12, wherein determining the proposed cluster is not viable:

identifying, by the automation controller, an error condition; and generating, by the automation controller, an alarm corresponding to the error condition.

* * * * *